(No Model.)

W. E. KABAT & H. HILL.
CHEESE VAT HEATER.

No. 533,129. Patented Jan. 29, 1895.

Witnesses:
Geo. N. Young.
Henry Plankert.

Inventor
Wenzel E. Kabat
Hugo Hill
By H. G. Underwood
Attorney

THE NORRIS PETERS CO., PHOTO-LITHO., WASHINGTON, D. C.

UNITED STATES PATENT OFFICE.

WENZEL E. KABAT AND HUGO HILL, OF REEDSVILLE, WISCONSIN.

CHEESE-VAT HEATER.

SPECIFICATION forming part of Letters Patent No. 533,129, dated January 29, 1895.

Application filed November 26, 1894. Serial No. 529,989. (No model.)

*To all whom it may concern:*

Be it known that we, WENZEL E. KABAT and HUGO HILL, citizens of the United States, and residents of Reedsville, in the county of Manitowoc and State of Wisconsin, have invented certain new and useful Improvements in Cheese-Vat Heaters; and we do hereby declare that the following is a full, clear, and exact description thereof.

Our invention relates to cheese-vat heaters, and consists in certain peculiarities of construction and combination of parts as will be fully set forth hereinafter and subsequently claimed.

Figure 1:
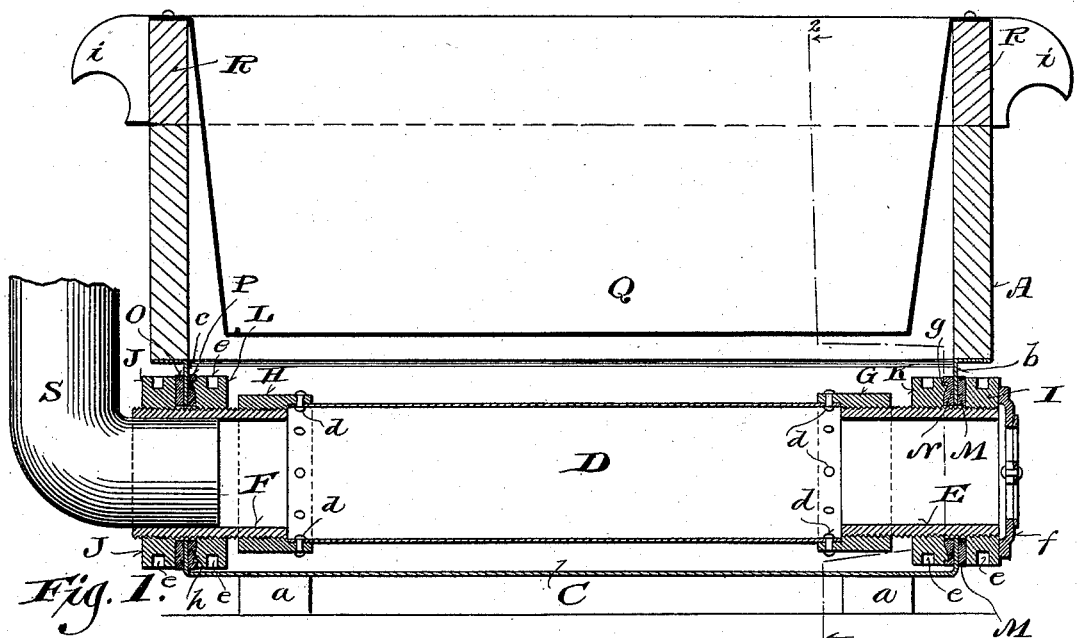
Figure 2:
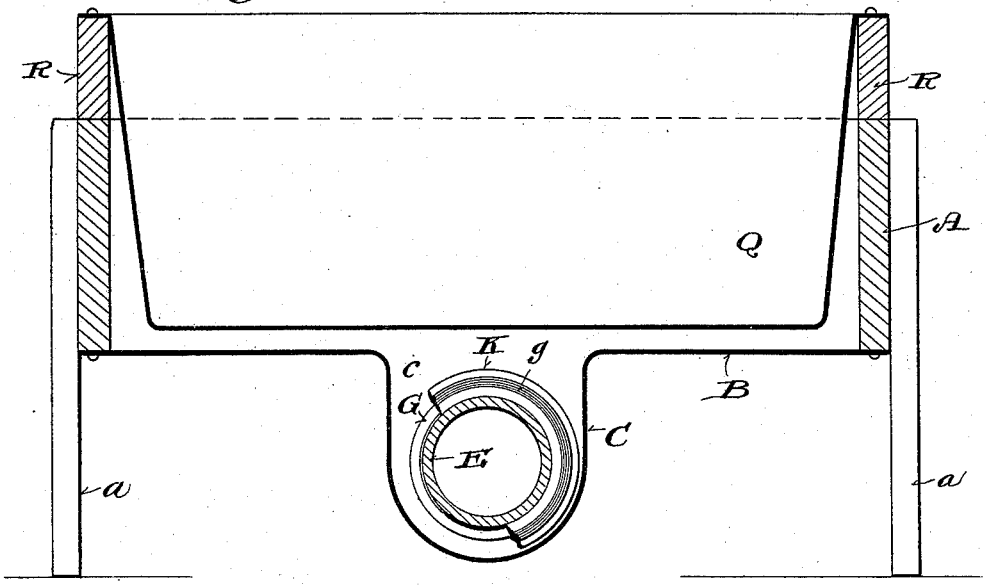
Figure 3:
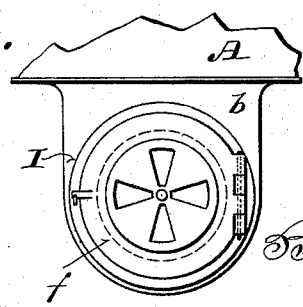

In the drawings: Figure 1 is a vertical longitudinal central sectional view of a device embodying our invention. Fig. 2 is a vertical transverse sectional view, on the line 2—2 of Fig. 1. Fig. 3 is a detail end elevation.

The object of our invention is to construct a heating vat in such a manner that the tubular heater can at any time be readily removed for repair or cleansing, and also so that said heater can be turned partly or wholly around from time to time, so that a new interior surface may be presented to the direct action of the heating medium, and thereby the life of the heater be greatly prolonged, as when said heater is so disposed within the vat that the fire must always be in one place, the heater very quickly burns through.

Referring to the drawings, A represents the outer vat, or tank, suitably supported upon legs $a\ a$ and having a metallic bottom B centrally formed into a depending trough C for the reception of the tubular heater D. The front $b$ and rear $c$ of this trough are formed of the same metal as the bottom B and are each formed with a circular opening for the passage therethrough of the sleeves E F which are externally screw-threaded as shown.

G, H, represent sleeves having interior screw-threads to receive the inner ends of the described sleeves E F, the inner ends of the sleeves G H being preferably formed with enlarged smooth bores to receive the adjacent ends of the tubular heater D, to which they are secured by any suitable means, as the rivets $d\ d$, so that said heater and its sleeves G H are rigidly united together.

I J represent the outer nuts, and K L the inner nuts of the device, all being preferably formed with peripheral sockets $e\ e$ for convenience in manipulation. To the exterior of the front outer nut I a door-frame and hinged door $f$ are secured, in any suitable manner, said door being provided with proper draft openings and the usual closing plate, as shown. These nuts are all provided with screw-threaded bores for engagement with the described sleeves E F.

M N and O P, represent pairs of packing rings or compressible gaskets, surrounding the sleeves E F, the ring or gasket M being between the nut I and front wall $b$ of the trough C, and the ring N between said wall and the nut K, and the other pair of rings or gaskets O P being similarly disposed with respect to the rear wall $c$ and the rear nuts of the device.

It will be noticed that the nuts K L are each provided on the side adjacent to the trough end-walls with annular beads $g\ h$, said beads being located nearer to the periphery than to the bore of said nuts, the object being to closely compress the rings or gaskets N P against the trough end-walls $b\ c$ as near the peripheries of said rings or gaskets as possible, so that when the trough C is filled with water, in use, none shall seep in between said rings or gaskets and the adjoining end-walls $b\ c$.

Q represents the vat or tank for the milk, suspended from a frame R R whose lower edge rests upon the top of the outer vat or tank A, the ends of said frame R being extended, as shown at $i\ i$, to form convenient lifting handles.

S is a suitable smoke-pipe fitted into the open rear end of the sleeve F.

The operation of our device will be readily understood from the foregoing description of its construction, taken in connection with the accompanying drawings. Let it be understood that the device is in the position shown in the drawings, ready for use in the ordinary manner of cheese-vat heaters. Now, if it is desired to remove the tubular heater D for any purpose, the milk vat Q is lifted out, the smoke-pipe S removed and the outer nuts I J unscrewed from the sleeves E, F. Then expanding wrenches are inserted within the sleeves E F and the same are screwed outward until their inner ends are free from engagement with the sleeves G H, when the tubular heater D can be lifted out of the trough C and outer vat A, for cleansing or repair, if necessary, and so that said heater may be replaced with a different portion undermost, if desired. The heater can be connected up to the sleeves in an obvious manner by a reverse operation of the expanding wrenches and the various nuts again readily tightened to place, and all parts that had been removed restored to their former operative position.

Having thus described our invention, what we claim as new, and desire to secure by Letters Patent, is—

1. In a cheese-vat, the combination with an outer tank or vat provided with a metallic bottom having a longitudinal trough therein, of externally screw-threaded sleeves extending through openings in the end walls of said trough, and a removable tubular heater having interiorly screw-threaded sleeves at the ends thereof for engagement with the first named sleeves, substantially as set forth.

2. In a cheese-vat, the combination with an outer tank or vat provided with a metallic bottom having a longitudinal trough therein, of externally screw-threaded sleeves extending through openings in the end walls of said trough, a removable tubular heater having interiorly screw-threaded sleeves secured to the ends thereof for engagement with said first named sleeves, packing rings or compressible gaskets surrounding said first named sleeves and in contact with said trough end-walls, and outer and inner nuts also surrounding said sleeves and in contact with said rings or gaskets, substantially as set forth.

3. In a cheese-vat, the combination with an outer tank or vat provided with a metallic bottom having a longitudinal trough therein, of externally screw-threaded sleeves extending through openings in the end-walls of said trough, a removable tubular heater having interiorly screw-threaded sleeves secured thereto for engagement with said first named sleeves, packing rings or compressible gaskets surrounding said sleeves on each side of the said trough end-walls, and outer and inner nuts on said sleeves in contact with said rings or gaskets, the said inner nuts being provided, on the side next to said rings or gaskets with annular beads located adjacent to the peripheries of said nuts, substantially as set forth.

In testimony that we claim the foregoing we have hereunto set our hands, at Reedsville, in the county of Manitowoc and State of Wisconsin, in the presence of two witnesses.

WENZEL E. KABAT.
HUGO HILL.

Witnesses:
CHARS. ETZLER,
JOSEPH KABAT.